(12) United States Patent
Tanaka et al.

(10) Patent No.: US 10,205,178 B2
(45) Date of Patent: Feb. 12, 2019

(54) FUEL CELL

(71) Applicant: HONDA MOTOR CO., LTD., Tokyo (JP)

(72) Inventors: Yukihito Tanaka, Wako (JP); Suguru Ohmori, Wako (JP); Eri Terada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 104 days.

(21) Appl. No.: 15/299,467

(22) Filed: Oct. 21, 2016

(65) Prior Publication Data

US 2017/0117558 A1    Apr. 27, 2017

(30) Foreign Application Priority Data

Oct. 22, 2015   (JP) ................ 2015-208352

(51) Int. Cl.
| | |
|---|---|
| *H01M 8/0258* | (2016.01) |
| *H01M 8/04007* | (2016.01) |
| *H01M 8/04082* | (2016.01) |
| *H01M 8/1018* | (2016.01) |

(52) U.S. Cl.
CPC ..... *H01M 8/0258* (2013.01); *H01M 8/04007* (2013.01); *H01M 8/04201* (2013.01); *H01M 2008/1095* (2013.01)

(58) Field of Classification Search
CPC ....... H01M 2008/1095; H01M 8/0258; H01M 8/04007; H01M 8/04201
See application file for complete search history.

(56) References Cited

U.S. PATENT DOCUMENTS

2012/0288783 A1 * 11/2012 Morimoto ........... H01M 4/8605
                                                              429/480

FOREIGN PATENT DOCUMENTS

| JP | 9-134734 | 5/1997 |
|---|---|---|
| JP | 2005-197195 | 7/2005 |
| JP | 2011-238438 | 11/2011 |
| JP | 2013-089407 | 5/2013 |
| JP | 2015-133269 | 7/2015 |
| WO | WO 2014/136965 | 9/2014 |

OTHER PUBLICATIONS

Japanese Office Action for corresponding JP Application No. 2015-208352, Jul. 11, 2017 (w/ English machine translation).

* cited by examiner

*Primary Examiner* — Jonathan G Leong
*Assistant Examiner* — Victoria H Lynch
(74) *Attorney, Agent, or Firm* — Mori & Ward, LLP

(57) ABSTRACT

A fuel cell includes a membrane electrode assembly having a substantially rectangular shape having a first side and a second side opposite to the first side in a side direction. The substantially rectangular shape includes a first portion and a second portion. The first portion is closer to the first side than to the second side in the side direction. At least one of a cathode electrode and an anode electrode has a smaller amount of cracks in an electrode catalyst layer in the first portion than in the second portion. A fuel gas outlet manifold and an oxidant gas inlet manifold are closer to the first side than to the second side in the side direction. A fuel gas inlet manifold and an oxidant gas outlet manifold are closer to the second side than to the first side in the side direction.

14 Claims, 9 Drawing Sheets

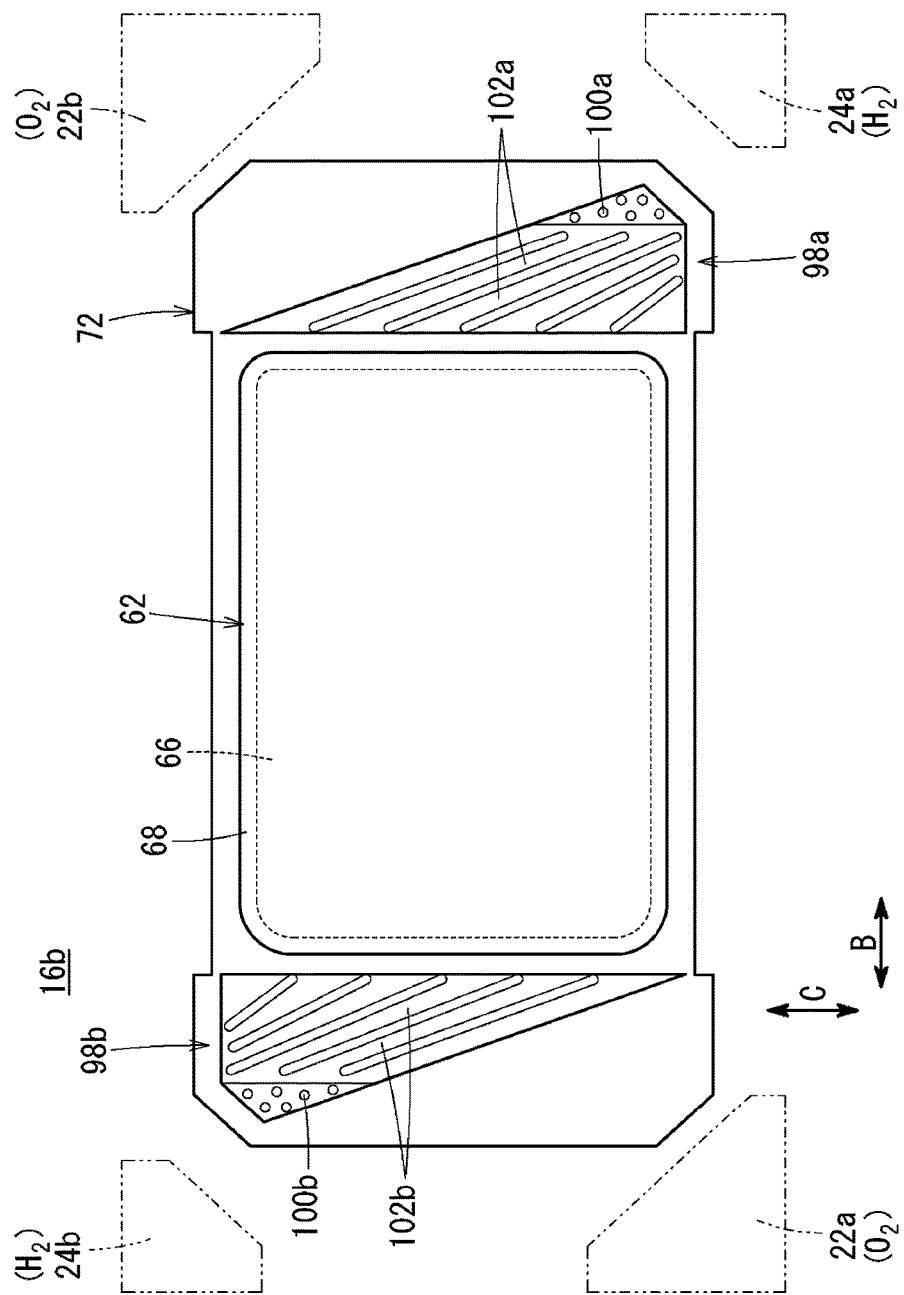

FUEL CELL

CROSS-REFERENCE TO RELATED APPLICATIONS

The present application claims priority under 35 U.S.C. § 119 to Japanese Patent Application No. 2015-208352, filed Oct. 22, 2015, entitled "Fuel Cell." The contents of this application are incorporated herein by reference in their entirety.

BACKGROUND

1. Field

The present disclosure relates to a fuel cell.

2. Description of the Related Art

In general, a solid polymer electrolyte fuel cell includes a solid polymer electrolyte membrane, which is a polymer ion-exchange membrane. The fuel cell includes a membrane electrode assembly (MEA), in which an anode electrode is disposed on one surface of the solid polymer electrolyte membrane and a cathode electrode is disposed on the other surface of the solid polymer electrolyte membrane. The anode electrode and the cathode electrode each include a catalyst layer (electrode catalyst layer) and a gas diffusion layer (porous carbon).

The membrane electrode assembly and separators (bipolar plates) that sandwich the membrane electrode assembly constitute a power generation cell (unit fuel cell). A predetermined number of power generation cells are stacked and used, for example, as a vehicle fuel cell stack.

In a fuel cell, when forming an anode electrode and a cathode electrode, cracks tend to occur due to, for example, the following factors: the direction in which a catalyst ink is applied; the anisotropy in the length direction (MD) and the width direction (TD) when manufacturing a solid polymer electrolyte membrane and porous carbon; and the sizes, the shapes, and the like of the electrodes.

For example, Japanese Unexamined Patent Application Publication No. 2013-089407 describes a method of manufacturing a membrane electrode assembly, which was devised in order to reduce the occurrence of cracks in a catalyst layer. In this manufacturing method, the concentration of water in a mixed solution used for a catalyst ink is adjusted so that a comparatively small amount of ink is absorbed into an electrolyte membrane. It is described that, by doing so, it is possible to suppress nonuniform expansion and contraction of the electrolyte membrane when the electrolyte membrane absorbs a solvent and to reduce the occurrence of cracks in a catalyst layer formed on the electrolyte membrane.

SUMMARY

According to one aspect of the present invention, a fuel cell includes a membrane electrode assembly having a rectangular shape and including a solid polymer electrolyte membrane, a cathode electrode disposed on one surface of the solid polymer electrolyte membrane, and an anode electrode disposed on the other surface of the solid polymer electrolyte membrane, and a separator stacked on the membrane electrode assembly.

The fuel cell includes a fuel gas channel through which a fuel gas flows along an electrode surface of the anode electrode, and an oxidant gas channel through which an oxidant gas flows along an electrode surface of the cathode electrode in a direction opposite to a direction in which the fuel gas flows through the fuel gas channel. The fuel cell includes a fuel gas outlet manifold and an oxidant gas inlet manifold that are formed near one end of the rectangular shape in a longitudinal direction, the fuel gas outlet manifold discharging the fuel gas in a stacking direction in which the membrane electrode assembly and the separator are stacked, the oxidant gas inlet manifold supplying the oxidant gas in the stacking direction. The fuel cell includes a fuel gas inlet manifold and an oxidant gas outlet manifold that are formed near the other end of the rectangular shape in the longitudinal direction, the fuel gas inlet manifold supplying the fuel gas in the stacking direction, the oxidant gas outlet manifold discharging the oxidant gas in the stacking direction. In at least one of the cathode electrode and the anode electrode, an amount of cracks in a portion of an electrode catalyst layer near the one end in the longitudinal direction is smaller than an amount of cracks in a portion of the electrode catalyst layer near the other end in the longitudinal direction.

According to another aspect of the present invention, a fuel cell includes a membrane electrode assembly, a separator, a fuel gas channel, an oxidant gas channel, a fuel gas outlet manifold, an oxidant gas inlet manifold, a fuel gas inlet manifold, an oxidant gas outlet manifold. The membrane electrode assembly has a substantially rectangular shape having a first side and a second side opposite to the first side in a side direction. The substantially rectangular shape includes a first portion and a second portion. The first portion is closer to the first side than to the second side in the side direction. The second portion is a remaining portion of the substantially rectangular shape which excludes the first portion. The membrane electrode assembly includes a solid polymer electrolyte membrane, a cathode electrode, and an anode electrode. The solid polymer electrolyte membrane has a first surface and a second surface opposite to the first surface in a stacking direction. The cathode electrode is disposed on the first surface. The anode electrode is disposed on the second surface. At least one of the cathode electrode and the anode electrode has a smaller amount of cracks in an electrode catalyst layer in the first portion than in the second portion. The separator is stacked on the membrane electrode assembly in the stacking direction. The fuel gas channel is provided on a side of the anode electrode. Through the fuel gas channel, a fuel gas flows in a first flow direction from the second side to the first side along an electrode surface of the anode electrode. The oxidant gas channel is provided on a side of the cathode electrode. Through the oxidant gas channel, an oxidant gas flows in a second flow direction from the first side to the second side along an electrode surface of the cathode electrode. The fuel gas outlet manifold is connected to the fuel gas channel to discharge the fuel gas in the stacking direction. The oxidant gas inlet manifold is connected to the oxidant gas channel to supply the oxidant gas in the stacking direction. The fuel gas outlet manifold and the oxidant gas inlet manifold are closer to the first side than to the second side in the side direction. The fuel gas inlet manifold is connected to the fuel gas channel to supply the fuel gas in the stacking direction. The oxidant gas outlet manifold is connected to the oxidant gas channel to discharge the oxidant gas in the stacking direction. The fuel gas inlet manifold and the oxidant gas outlet manifold are closer to the second side than to the first side in the side direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 9 illustrates the other surface of the second resin-framed MEA.

DESCRIPTION OF THE EMBODIMENTS

Figure 1:
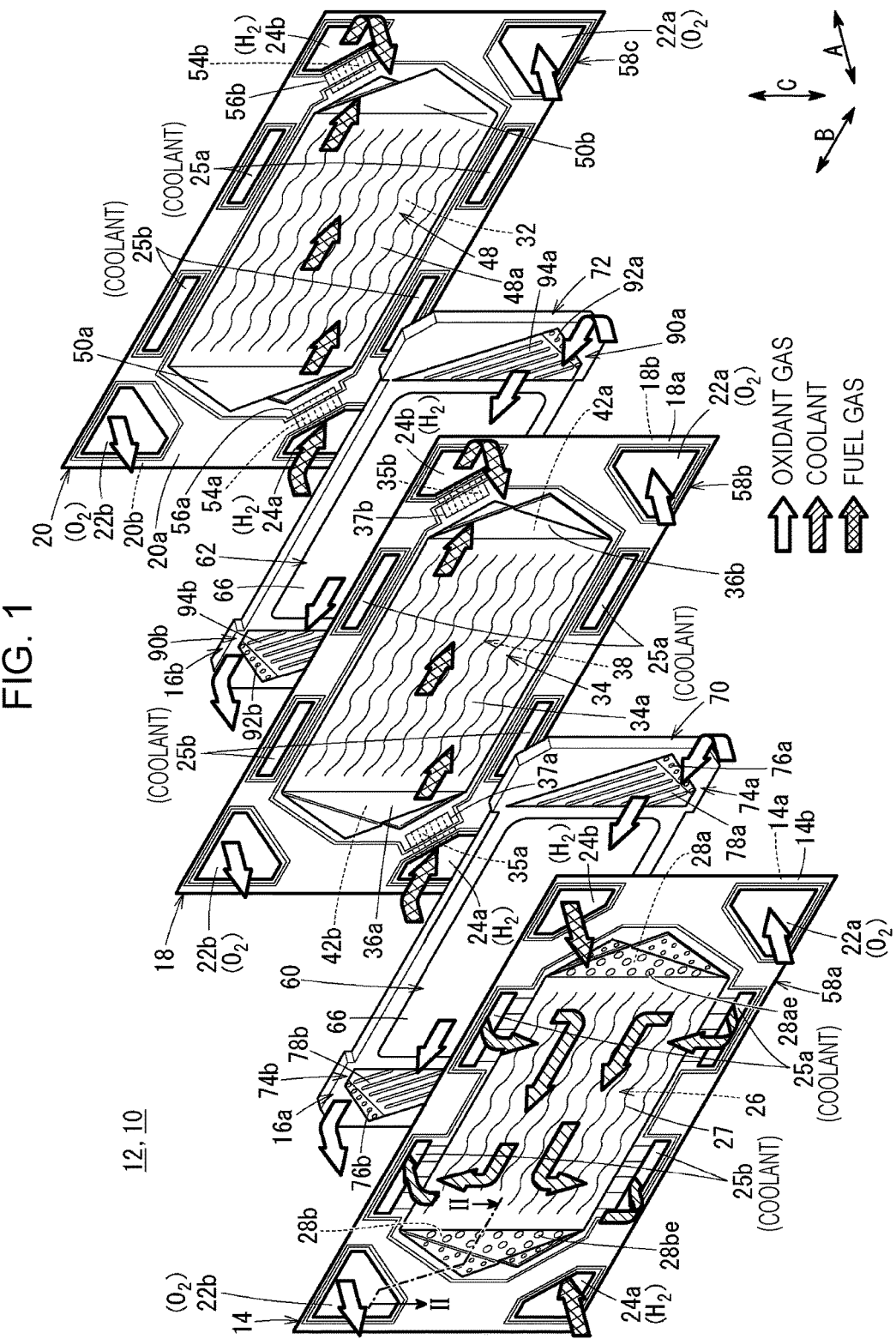
FIG. 1 is an exploded perspective view of a power generation cell included in a fuel cell according to an embodiment of the present disclosure.

The embodiments will now be described with reference to the accompanying drawings, wherein like reference numerals designate corresponding or identical elements throughout the various drawings.

Figure 2:
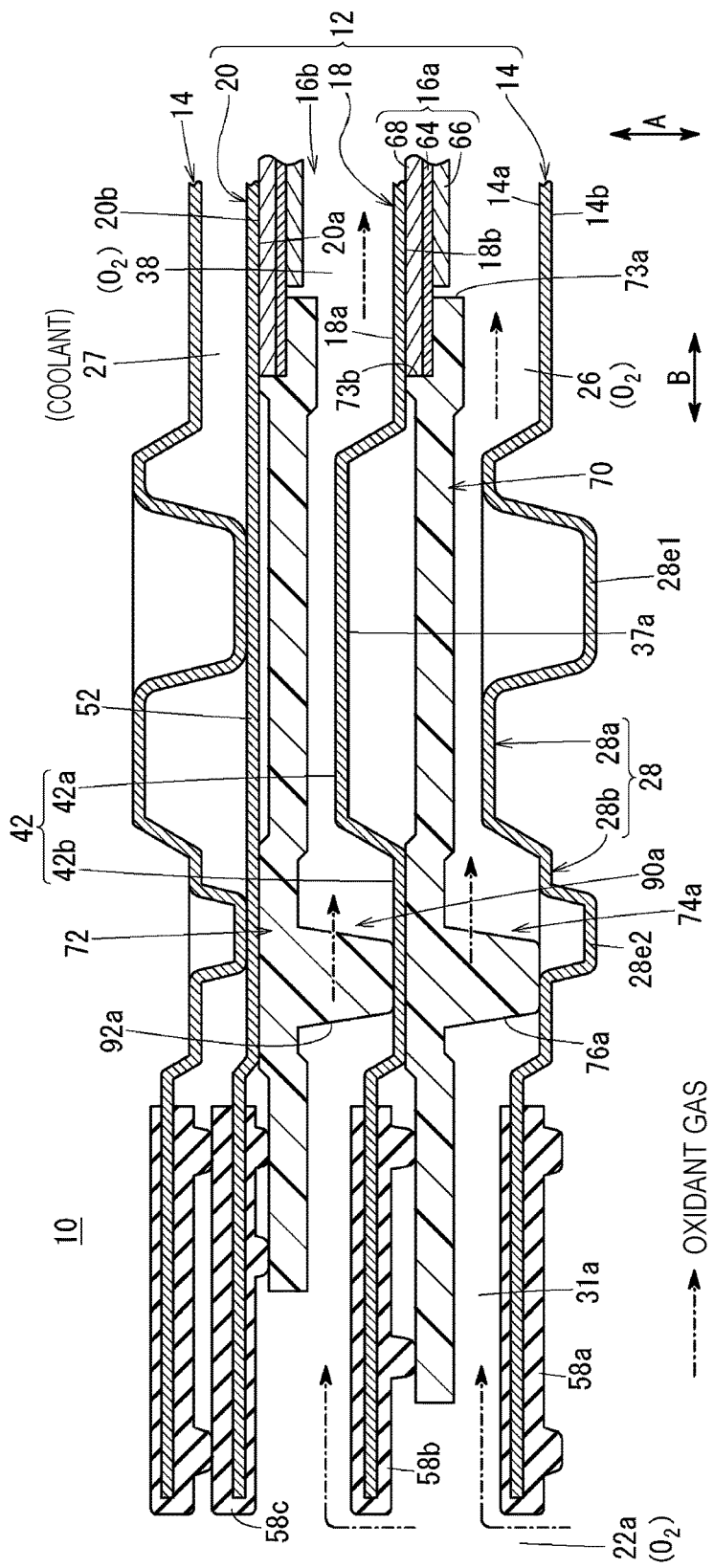
FIG. 2 is a sectional view of the power generation cell taken along line II-II of FIG. 1.

Referring to FIGS. 1 and 2, a fuel cell 10 according to an embodiment of the present disclosure includes a plurality of power generation cells 12 that are stacked in a horizontal direction (direction of arrow A) or in a vertical direction (direction of arrow C). The fuel cell 10 is used, for example, as a vehicle fuel cell stack mounted in a fuel cell electric automobile (not shown).

Each of the power generation cells 12 includes a first metal separator 14, a first resin-framed MEA (resin-framed membrane electrode assembly) 16a, a second metal separator 18, a second resin-framed MEA (resin-framed membrane electrode assembly) 16b, and a third metal separator 20.

Each of the first metal separator 14, the second metal separator 18, and the third metal separator 20 is made from, for example, a steel plate, a stainless steel plate, an aluminum plate, a galvanized steel plate, or the like. Each of the first metal separator 14, the second metal separator 18, and the third metal separator 20, which has a rectangular shape in plan view, is made by press-forming a thin metal plate so as to have a wave-shaped cross section. Carbon separators may be used instead of the first metal separator 14, the second metal separator 18, and the third metal separator 20.

Referring to FIG. 1, an oxidant gas inlet manifold 22a and a fuel gas outlet manifold 24b are disposed in the power generation cell 12 so as to extend in the direction of arrow A through one end portion of the power generation cell 12 in the longitudinal direction (direction of arrow B). An oxidant gas, such as an oxygen-containing gas, is supplied through the oxidant gas inlet manifold 22a. A fuel gas, such as a hydrogen-containing gas, is discharged through the fuel gas outlet manifold 24b.

A fuel gas inlet manifold 24a and an oxidant gas outlet manifold 22b are disposed in the power generation cell 12 so as to extend in the direction of arrow A through the other end portion of the power generation cell 12 in the longitudinal direction. The fuel gas is supplied through the fuel gas inlet manifold 24a. The oxidant gas is discharged through the oxidant gas outlet manifold 22b.

A pair of coolant inlet manifolds 25a are disposed in the power generation cell 12 so as to extend in the direction arrow A through upper and lower end portions (that are near the oxidant gas inlet manifold 22a) of the power generation cell 12 in the transversal direction (direction of arrow C). A coolant is supplied through the coolant inlet manifolds 25a. A pair of coolant outlet manifolds 25b are disposed in upper and lower end portions (that are near the fuel gas inlet manifold 24a) of the power generation cell 12 in the transversal direction. The coolant is discharged through the coolant outlet manifolds 25b.

Figure 3:
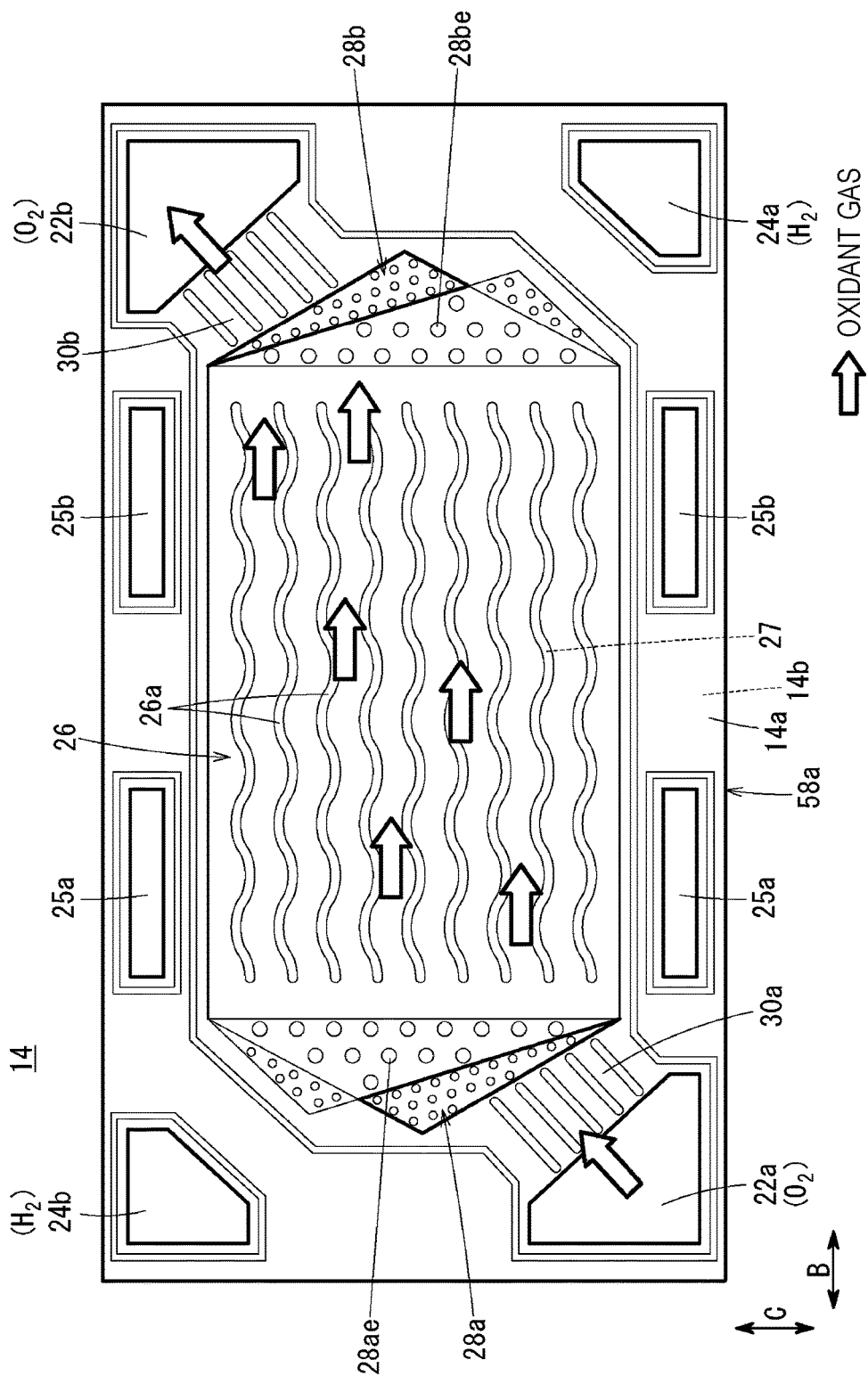
FIG. 3 illustrates one surface of a first metal separator of the power generation cell.

Referring to FIG. 3, a first oxidant gas channel 26, which is connected to the oxidant gas inlet manifold 22a and the oxidant gas outlet manifold 22b, is formed on a surface 14a of the first metal separator 14 facing the first resin-framed MEA 16a. The back side of the first oxidant gas channel 26 forms a part of a coolant channel 27.

The first oxidant gas channel 26 includes a plurality of wave-shaped channel grooves 26a (or linear channel grooves) extending in the direction of arrow B. A first oxidant gas inlet buffer portion 28a and a first oxidant gas outlet buffer portion 28b are respectively disposed in the vicinity of the inlet of the first oxidant gas channel 26 and in the vicinity of the outlet of the first oxidant gas channel 26.

The first oxidant gas inlet buffer portion 28a has a triangular shape and includes a plurality of embossed portions 28ae. The first oxidant gas outlet buffer portion 28b has a triangular shape and includes a plurality of embossed portions 28be. Each of the embossed portions 28ae and 28be may have an elliptical or a quadrangular shape.

A plurality of inlet connection grooves 30a are formed between the first oxidant gas inlet buffer portion 28a and the oxidant gas inlet manifold 22a. A plurality of outlet connection grooves 30b are formed between the first oxidant gas outlet buffer portion 28b and the oxidant gas outlet manifold 22b.

Referring to FIG. 1, a first fuel gas channel 34, which is connected to the fuel gas inlet manifold 24a and the fuel gas outlet manifold 24b, is formed on a surface 18a of the second metal separator 18 facing the first resin-framed MEA 16a. The first fuel gas channel 34 includes a plurality of wave-shaped channel grooves 34a (or linear channel grooves) extending in the direction of arrow B. The direction in which the oxidant gas flows in the first oxidant gas channel 26 is opposite to the direction in which the fuel gas flows in the first fuel gas channel 34. In the first oxidant gas channel 26, the oxidant gas flows in one direction. In the first fuel gas channel 34, the fuel gas flows in one direction.

A first fuel gas inlet buffer portion 36a and a first fuel gas outlet buffer portion 36b are respectively disposed in the vicinity of the inlet of the first fuel gas channel 34 and in the vicinity of the outlet of the first fuel gas channel 34. The first fuel gas inlet buffer portion 36a and the first fuel gas outlet buffer portion 36b each have a triangular shape.

A plurality of inlet connection grooves 35a are formed between the first fuel gas inlet buffer portion 36a and the fuel gas inlet manifold 24a. The inlet connection grooves 35a are covered by a cover member 37a. A plurality of outlet connection grooves 35b are formed between the first fuel gas outlet buffer portion 36b and the fuel gas outlet manifold 24b. The outlet connection grooves 35b are covered by a cover member 37b.

Figure 4:
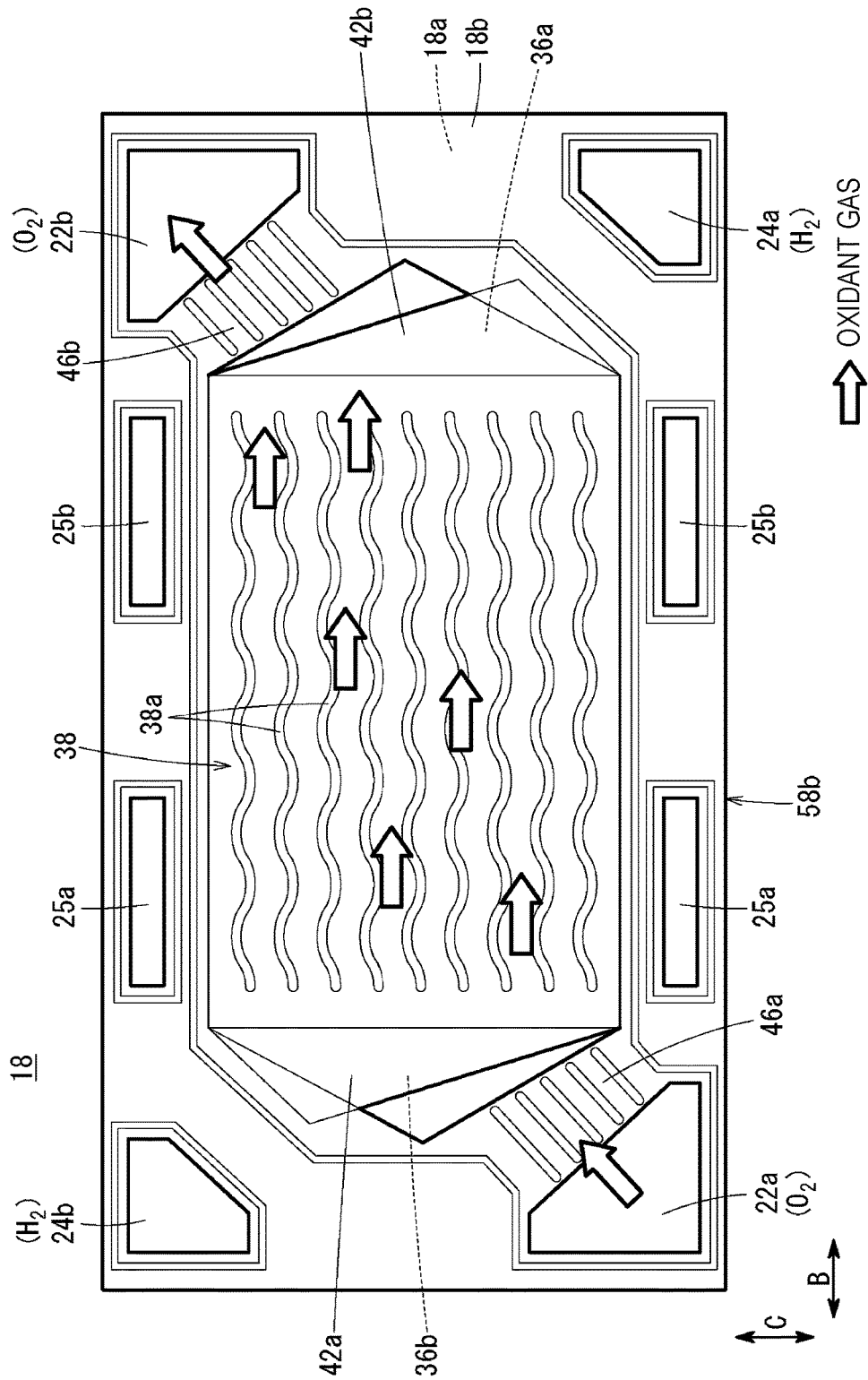
FIG. 4 is a plan view of a second metal separator of the power generation cell.

Referring to FIG. 4, a second oxidant gas channel 38, which is connected to the oxidant gas inlet manifold 22a and the oxidant gas outlet manifold 22b, is formed on a surface 18b of the second metal separator 18 facing the second resin-framed MEA 16b. The second oxidant gas channel 38 includes a plurality of wave-shaped channel grooves 38a (or linear channel grooves) extending in the direction of arrow B. The shape of the back side of the second oxidant gas channel 38, which is formed on the second metal separator 18, is the shape of the first fuel gas channel 34.

A second oxidant gas inlet buffer portion 42a and a second oxidant gas outlet buffer portion 42b are respectively disposed in the vicinity of the inlet of the second oxidant gas channel 38 and in the vicinity of the outlet of the second oxidant gas channel 38. The second oxidant gas inlet buffer portion 42a and the second oxidant gas outlet buffer portion 42b each have a triangular shape.

A plurality of inlet connection grooves 46a are formed between the second oxidant gas inlet buffer portion 42a and the oxidant gas inlet manifold 22a. A plurality of outlet connection grooves 46b are formed between the second oxidant gas outlet buffer portion 42b and the oxidant gas outlet manifold 22b.

Referring to FIG. 1, a second fuel gas channel 48, which is connected to the fuel gas inlet manifold 24a and the fuel gas outlet manifold 24b, is formed on a surface 20a of the third metal separator 20 facing the second resin-framed MEA 16b. The second fuel gas channel 48 includes a plurality of wave-shaped channel grooves 48a (or linear channel grooves) extending in the direction of arrow B. The direction in which the oxidant gas flows in the second oxidant gas channel 38 is opposite to the direction in which the fuel gas flows in the second fuel gas channel 48. In the second oxidant gas channel 38, the oxidant gas flows in one direction. In the second fuel gas channel 48, the fuel gas flows in one direction.

A second fuel gas inlet buffer portion 50a and a second fuel gas outlet buffer portion 50b are respectively disposed in the vicinity of the inlet of the second fuel gas channel 48 and in the vicinity of the outlet of the second fuel gas channel 48. The second fuel gas inlet buffer portion 50a and the second fuel gas outlet buffer portion 50b each have a substantially triangular shape.

A plurality of inlet connection grooves 54a are formed between the second fuel gas inlet buffer portion 50a and the fuel gas inlet manifold 24a. The inlet connection grooves 54a are covered by a cover member 56a. A plurality of outlet connection grooves 54b are formed between the second fuel gas outlet buffer portion 50b and the fuel gas outlet manifold 24b. The outlet connection grooves 54b are covered by a cover member 56b.

On a surface 20b of the third metal separator 20, a part of the coolant channel 27 is formed on the back side of the second fuel gas channel 48. When a surface 14b of the first metal separator 14 adjacent to the third metal separator 20 is placed on the surface 20b of the third metal separator 20, the coolant channel 27 is integrally formed on the surface 20b.

Referring to FIG. 1, a first sealing member 58a is integrally formed on the surfaces 14a and 14b of the first metal separator 14 so as to surround the outer peripheral end portion of the first metal separator 14. A second sealing member 58b is integrally formed on the surfaces 18a and 18b of the second metal separator 18 so as to surround the outer peripheral end portion of the second metal separator 18. A third sealing member 58c is integrally formed on the surfaces 20a and 20b of the third metal separator 20 so as to surround the outer peripheral end portion of the third metal separator 20.

The first sealing member 58a, the second sealing member 58b, and the third sealing member 58c are each made of an elastic rubber material, such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene rubber, and acrylic rubber.

The first resin-framed MEA 16a has a horizontally-elongated shape (rectangular shape) and includes a first membrane electrode assembly 60. The second resin-framed MEA 16b has a horizontally-elongated shape (rectangular shape) and includes a second membrane electrode assembly 62. Referring to FIG. 2, the first membrane electrode assembly 60 and the second membrane electrode assembly 62 each include a solid polymer electrolyte membrane 64, which is, for example, a thin film that is made of a perfluorosulfonic acid polymer including water. The solid polymer electrolyte membrane 64 is sandwiched between a cathode electrode 66 and an anode electrode 68.

Each of the first membrane electrode assembly 60 and the second membrane electrode assembly 62 is a stepped MEA in which the planar dimensions of the cathode electrode 66 are smaller than those of the anode electrode 68 and the solid polymer electrolyte membrane 64. Alternatively, the first and second membrane electrode assemblies 60 and 62 are not limited to stepped MEAs, and the cathode electrode 66 may have planar dimensions the same as those of the anode electrode 68 and the solid polymer electrolyte membrane 64. The anode electrode 68 may have planar dimensions smaller than those of the cathode electrode 66 and the solid polymer electrolyte membrane 64.

Figure 5:
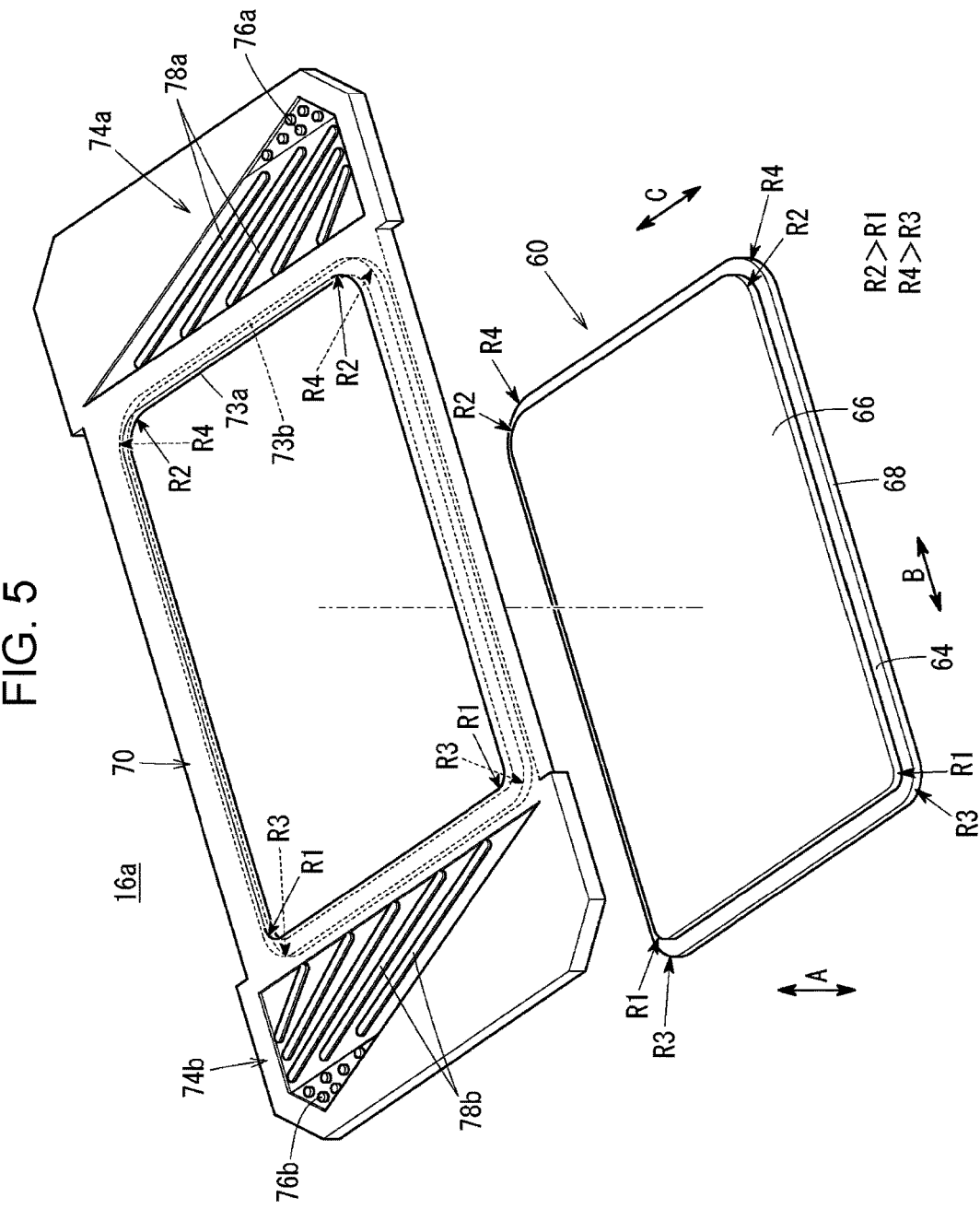
FIG. 5 is an exploded perspective view of a first resin-framed MEA of the power generation cell.
Figure 6:
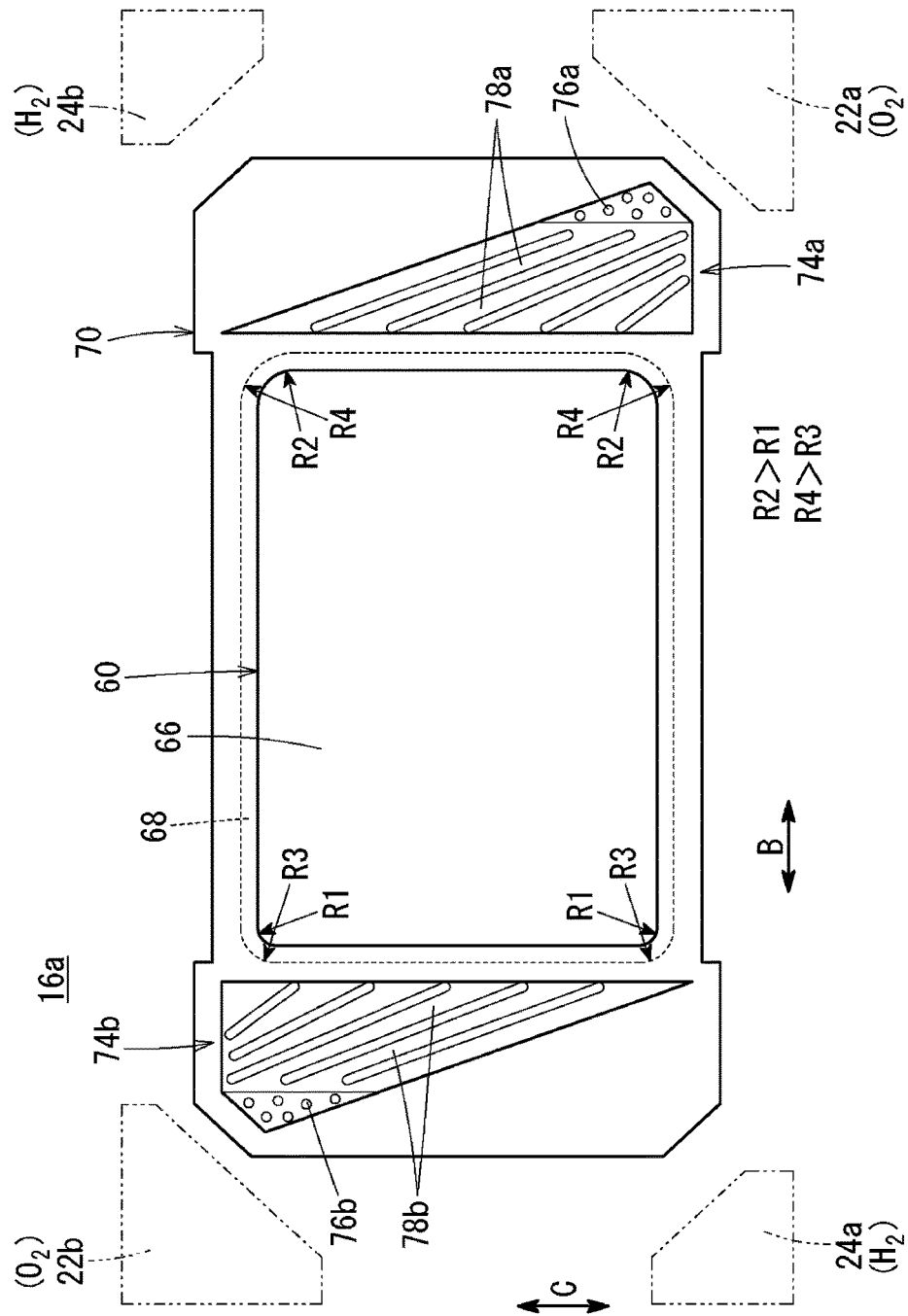
FIG. 6 illustrates one surface of the first resin-framed MEA.

Referring to FIGS. 5 and 6, two corners of the cathode electrode 66 near the oxidant gas outlet manifold 22b (near one end in the longitudinal direction) each have a predetermined radius of curvature R1. Two corners of the cathode electrode 66 near the fuel gas outlet manifold 24b (near the other end portion in the longitudinal direction) each have a predetermined radius of curvature R2. The radius of curvature R1 and the radius of curvature R2 differ from each other. For example, R1<R2. Instead of the round shapes, the corners may have chamfered shapes that differ from each other. The relationship of the size between R1 and R2 may be opposite to the one described above. As long as the shapes of the corners near the one end in the longitudinal direction differ from those near the other end in the longitudinal direction, the shapes of the corners are not restricted to round shapes or chamfered shapes.

Two corners of the anode electrode 68 near the oxidant gas outlet manifold 22b each have a predetermined radius of curvature R3. Two corners of the anode electrode 68 near the fuel gas outlet manifold 24b each have a predetermined radius of curvature R4. Preferably, the radius of curvature R3 and the radius of curvature R4 differ from each other. For example, R3<R4. The relationship of the size between R3 and R4 may be opposite to the one described above. As long as the shapes of the corners near the one end in the longitudinal direction differ from those near the other end in the longitudinal direction, the shapes of the corners are not restricted to round shapes or chamfered shapes.

Referring to FIG. 2, the cathode electrode 66 and the anode electrode 68 each include a gas diffusion layer (not shown) and an electrode catalyst layer (not shown). The gas diffusion layer is made of carbon paper or the like. The electrode catalyst layer is formed by uniformly coating a surface of the gas diffusion layer with porous carbon particles whose surfaces support a platinum alloy. The electrode catalyst layers are formed, for example, on both sides of the solid polymer electrolyte membrane 64.

In the first membrane electrode assembly 60, a first resin frame member 70 is disposed on an outer periphery of the solid polymer electrolyte membrane 64 so as to be located outward from an edge of the cathode electrode 66. The first resin frame member 70 is integrally formed, for example, by using an adhesive or by welding. In the second membrane electrode assembly 62, a second resin frame member 72 is disposed on an outer periphery of the solid polymer electrolyte membrane 64 so as to be located outward from an edge of the cathode electrode 66. The second resin frame member 72 is integrally formed, for example, by using an adhesive or by welding.

An electrically insulating commodity plastic, an engineering plastic, a super engineering plastic, or the like may be used as the material of the first resin frame member 70 and the second resin frame member 72. Each of the resin frame members 70 and 72 may be made from, for example, a film or the like. The first resin frame member 70 and the second resin frame member 72 have outer shapes having dimensions such that the resin frame members 70 and 72 are disposed further inward from the each manifold, including the oxidant gas inlet manifold 22a.

Referring to FIGS. 2 and 5, the first resin frame member 70 has an inner opening 73a, in which the cathode electrode 66 is accommodated, and an outer opening 73b, in which the anode electrode 68 is accommodated. The shape of the inner opening 73a is the same as the outer shape of the cathode electrode 66. Referring to FIG. 5, two corners of the inner opening 73a near one end in the longitudinal direction (near the oxidant gas outlet manifold 22b) each have the radius of curvature R1, and two corners of the inner opening 73a near the other end in the longitudinal direction (near the fuel gas outlet manifold 24b) each have a radius of curvature R2. The radii of curvature R1 and R2 are the same as those of the outer shape of the cathode electrode 66.

The shape of the outer opening 73b is the same as the outer shape of the anode electrode 68. Two corners of the outer opening 73b near one end in the longitudinal direction (near the oxidant gas outlet manifold 22b) each have a radius of curvature R3, and two corners of the outer opening 73b near the other end in the longitudinal direction (near the fuel gas outlet manifold 24b) each have a radius of curvature R4. The radii of curvature R3 and R4 are the same as those of the outer shape of the anode electrode 68.

Figure 8:
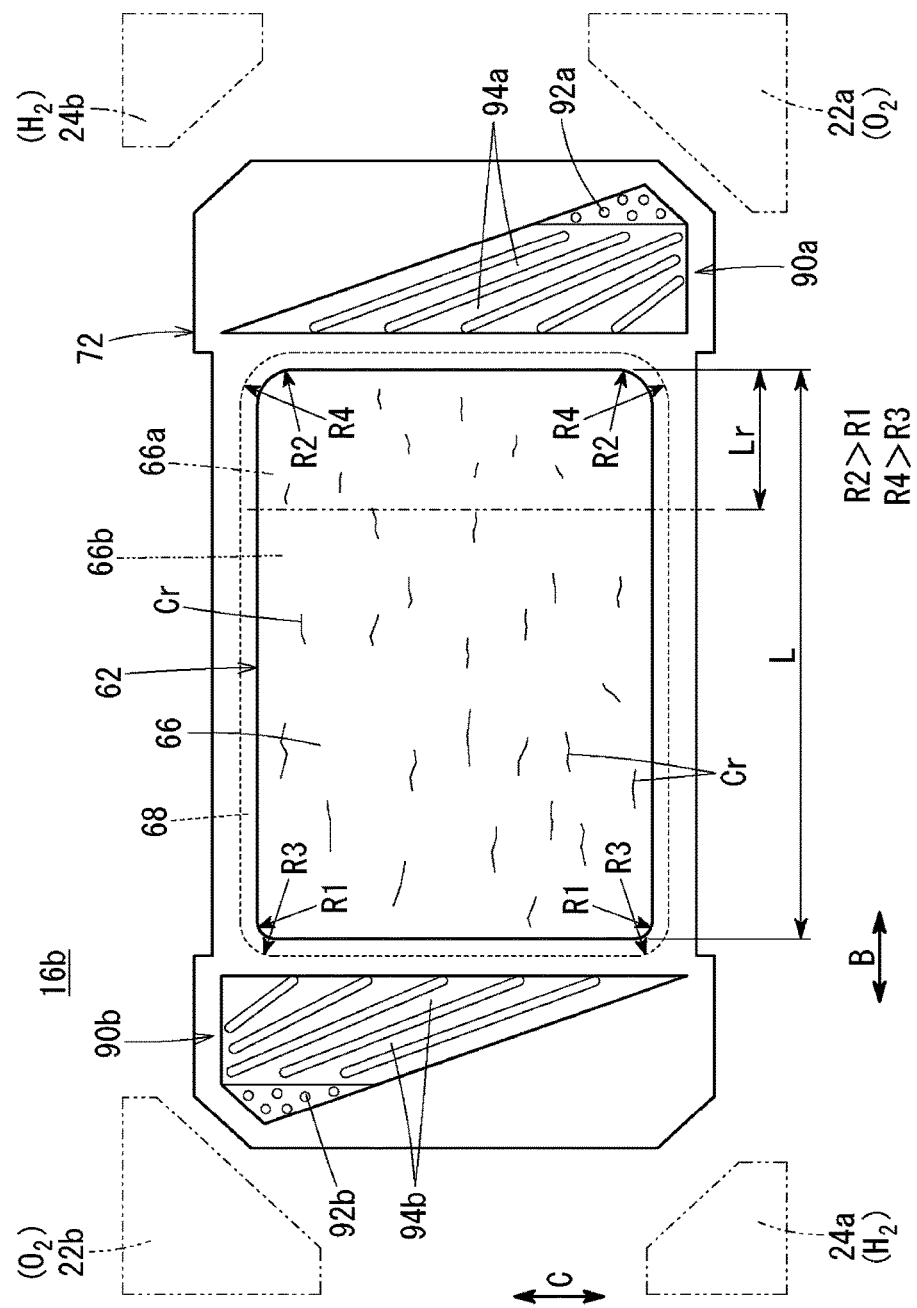
FIG. 8 illustrates one surface of a second resin-framed MEA of the power generation cell.

Referring to FIG. 8, in the second membrane electrode assembly 62, a plurality of cracks Cr are formed in the electrode catalyst layer of the cathode electrode 66. In the cathode electrode 66, the amount of cracks in a portion of the electrode catalyst layer near one end in the longitudinal direction (near the fuel gas outlet manifold 24b) is smaller than the amount of cracks in a portion of the electrode catalyst layer near the other end in the longitudinal direction (near the oxidant gas outlet manifold 22b).

To be specific, the cathode electrode 66 includes a first region 66a, which is in the range of 0.02×L to 0.1×L (shown by "Lr" in FIG. 8) from one end in the longitudinal direction, where L is the length of the electrode catalyst layer in the longitudinal direction. A second region 66b is the remaining portion. The region in the range of 0.02×L to 0.1×L is a region that tends to be damaged most easily.

In the present embodiment, the length or the width of a crack Cr (the maximum value of the length or the width of a single crack or the average of the lengths or the widths of a plurality of cracks) in the first region 66a is smaller than the length or the width of a crack Cr (the maximum value of the length or the width of a single crack or the average of the lengths or the widths of a plurality of cracks) in the second region 66b. The first membrane electrode assembly 60 is structured in the same way as the second membrane electrode assembly 62.

Referring to FIGS. 1 and 6, on a surface of the first resin frame member 70 on the cathode electrode 66 side, an inlet buffer portion 74a is disposed between the oxidant gas inlet manifold 22a and the inlet of the first oxidant gas channel 26. On the surface of the first resin frame member 70 on the cathode electrode 66 side, an outlet buffer portion 74b is disposed between the oxidant gas outlet manifold 22b and the outlet of the first oxidant gas channel 26.

The inlet buffer portion 74a includes a plurality of embossed portions 76a (or a flat surface), which are located close to the oxidant gas inlet manifold 22a, and a plurality of linear inlet guide channels 78a (or embossed portions), which are located close to the first oxidant gas channel 26. The outlet buffer portion 74b includes a plurality of embossed portions 76b (or a flat surface), which are located close to the oxidant gas outlet manifold 22b, and a plurality of linear outlet guide channels 78b (or embossed portions), which are located close to the first oxidant gas channel 26.

Figure 7:
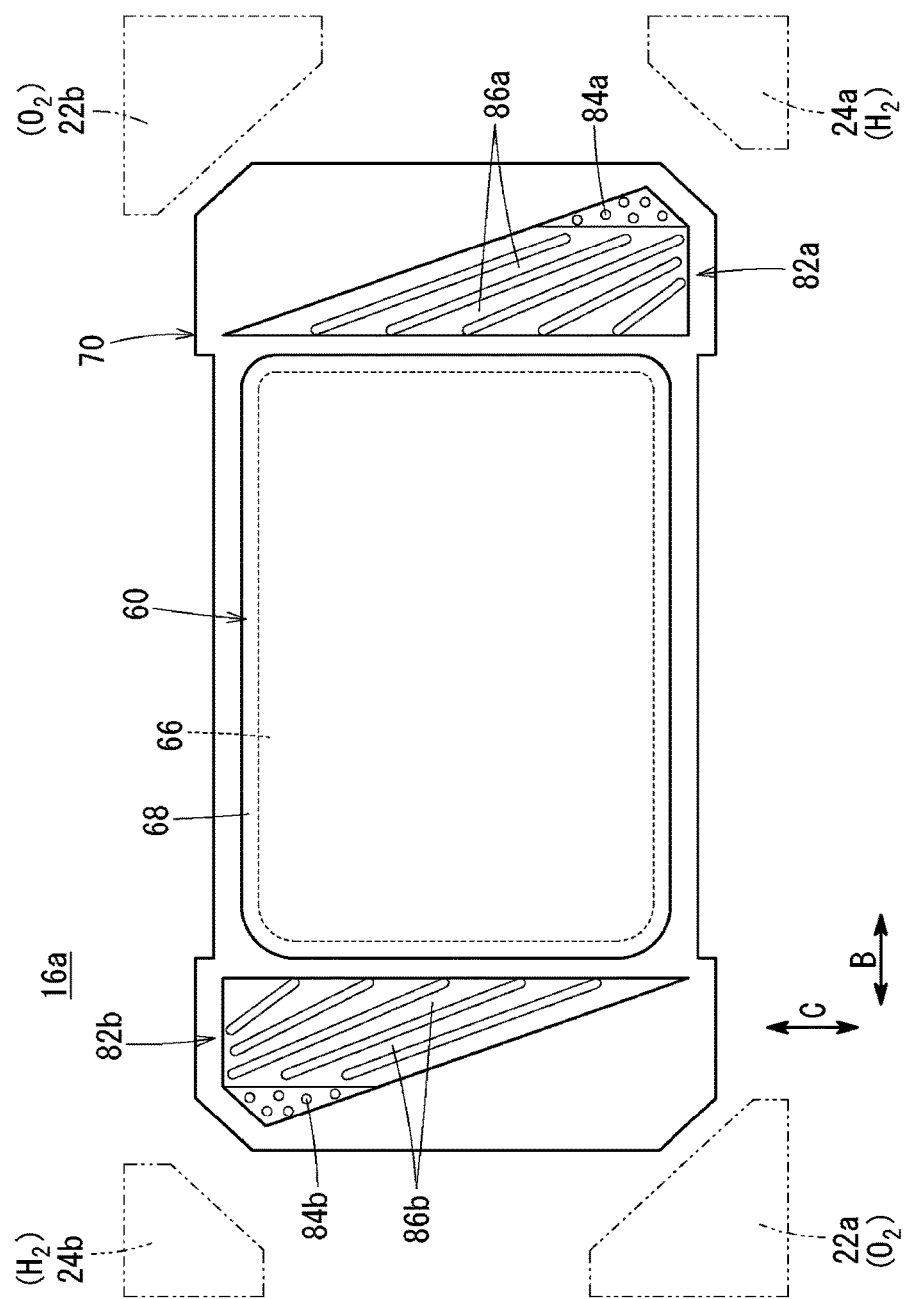
FIG. 7 illustrates the other surface of the first resin-framed MEA.

Referring to FIG. 7, on a surface of the first resin frame member 70 on the anode electrode 68 side, an inlet buffer portion 82a is disposed between the fuel gas inlet manifold 24a and the first fuel gas channel 34. On the surface of the first resin frame member 70 on the anode electrode 68 side, an outlet buffer portion 82b is disposed between the fuel gas outlet manifold 24b and the first fuel gas channel 34.

The inlet buffer portion 82a includes a plurality of embossed portions 84a (or a flat surface), which are located close to the fuel gas inlet manifold 24a, and a plurality of linear inlet guide channels 86a (or embossed portions), which are located close to the first fuel gas channel 34. The outlet buffer portion 82b includes a plurality of embossed portions 84b (or a flat surface), which are located close to the fuel gas outlet manifold 24b, and a plurality of linear outlet guide channels 86b (or embossed portions), which are located close to the first fuel gas channel 34.

Referring to FIGS. 1 and 8, on a surface of the second resin frame member 72 on the cathode electrode 66 side, an inlet buffer portion 90a is disposed between the oxidant gas inlet manifold 22a and the inlet of the second oxidant gas channel 38. On the surface of the second resin frame member 72 on the cathode electrode 66 side, an outlet buffer portion 90b is disposed between the oxidant gas outlet manifold 22b and the outlet of the second oxidant gas channel 38.

The inlet buffer portion 90a includes a plurality of embossed portions 92a (or a flat surface), which are located close to the oxidant gas inlet manifold 22a, and a plurality of linear inlet guide channels 94a (or embossed portions), which are located close to the second oxidant gas channel 38. The outlet buffer portion 90b includes a plurality of embossed portions 92b (or a flat surface), which are located close to the oxidant gas outlet manifold 22b, and a plurality of linear outlet guide channels 94b (or embossed portions), which are located close to the second oxidant gas channel 38.

Referring to FIG. 9, on a surface of the second resin frame member 72 on the anode electrode 68 side, an inlet buffer portion 98a is disposed between the fuel gas inlet manifold 24a and the second fuel gas channel 48. On the surface of the second resin frame member 72 on the anode electrode 68 side, an outlet buffer portion 98b is disposed between the fuel gas outlet manifold 24b and the second fuel gas channel 48.

The inlet buffer portion 98a includes a plurality of embossed portions 100a (or a flat surface), which are located close to the fuel gas inlet manifold 24a, and a plurality of linear inlet guide channels 102a (or embossed portions), which are located close to the second fuel gas channel 48. The outlet buffer portion 98b includes a plurality of embossed portions 100b (or a flat surface), which are located close to the fuel gas outlet manifold 24b, and a plurality of linear outlet guide channels 102b (or embossed portions), which are located close to the second fuel gas channel 48.

When two power generation cells 12 are stacked on top of each other, the coolant channel 27 is formed between the first metal separator 14 of one of the power generation cells 12 and the third metal separator 20 of the other power generation cell 12 (see FIGS. 1 and 2).

An operation of the fuel cell 10, which is structured as described above, will be described.

Referring to FIG. 1, an oxidant gas, such as an oxygen-containing gas, is supplied to the oxidant gas inlet manifold 22a. A fuel gas, such as a hydrogen-containing gas, is supplied to the fuel gas inlet manifold 24a. A coolant, such as pure water, ethylene glycol, or oil, is supplied to the pair of coolant inlet manifolds 25a.

A part of the oxidant gas flows through the oxidant gas inlet manifold 22a, the inlet buffer portion 74a, and the first oxidant gas inlet buffer portion 28a; and is supplied to the first oxidant gas channel 26 of the first metal separator 14 (see FIGS. 1 and 3). The remaining part of the oxidant gas flows through the oxidant gas inlet manifold 22a, the inlet buffer portion 90a, and the second oxidant gas inlet buffer portion 42a; and flows into the second oxidant gas channel 38 of the second metal separator 18 (see FIGS. 1 and 4).

Referring to FIGS. 1, 3, and 4, the oxidant gas is supplied to the cathode electrode 66 of the first membrane electrode assembly 60 while flowing along the first oxidant gas channel 26 in the direction of arrow B (horizontal direction). Likewise, the oxidant gas is supplied to the cathode electrode 66 of the second membrane electrode assembly 62 while flowing along the second oxidant gas channel 38 in the direction of arrow B.

Referring to FIGS. 1 and 8, the fuel gas flows through the fuel gas inlet manifold 24a and the inlet connection grooves 35a of the second metal separator 18 and is supplied to the inlet buffer portion 82a and the first fuel gas inlet buffer portion 36a. Likewise, referring to FIGS. 1 and 9, the fuel gas flows through the inlet connection grooves 54a of the third metal separator 20 and is supplied to the inlet buffer portion 98a and the second fuel gas inlet buffer portion 50a. Therefore, the fuel gas is supplied to the first fuel gas channel 34 of the second metal separator 18 and the second fuel gas channel 48 of the third metal separator 20.

The fuel gas is supplied to the anode electrode 68 of the first membrane electrode assembly 60 while flowing along the first fuel gas channel 34 in the direction of arrow B. Likewise, the fuel gas is supplied to the anode electrode 68 of the second membrane electrode assembly 62 while flowing along the second fuel gas channel 48 in the direction of arrow B.

Accordingly, in the first membrane electrode assembly 60 and the second membrane electrode assembly 62, the oxidant gas supplied to the cathode electrodes 66 and the fuel gas supplied to the anode electrodes 68 cause electrochemical reactions in the electrode catalyst layers, and thereby electric power is generated.

The oxidant gas, which has been supplied to the cathode electrodes 66 of the first membrane electrode assembly 60 and the second membrane electrode assembly 62 and partially consumed, is discharged to the outlet buffer portions 74b and 90b. The oxidant gas is discharged from the first oxidant gas outlet buffer portion 28b and the second oxidant gas outlet buffer portion 42b to the oxidant gas outlet manifold 22b.

The fuel gas, which has been supplied to the anode electrodes 68 of the first membrane electrode assembly 60 and the second membrane electrode assembly 62 and partially consumed, is discharged to the outlet buffer portions 82b and 98b. The fuel gas is discharged from the first fuel gas outlet buffer portion 36b and the second fuel gas outlet buffer portion 50b to the fuel gas outlet manifold 24b through the outlet connection grooves 35b and 54b.

Referring to FIG. 1, the coolant, which has been supplied to the pair of upper and lower coolant inlet manifolds 25a, is introduced into the coolant channel 27. The coolant is suppled from the coolant inlet manifolds 25a to the coolant channel 27, temporarily flows inward in the direction of arrow C, then flows in the direction of arrow B, and cools the first membrane electrode assembly 60 and the second membrane electrode assembly 62. Then, the coolant flows outward in the direction of arrow C and is discharged to the pair of coolant outlet manifolds 25b.

In the present embodiment, in the cathode electrode 66, the amount of cracks in a portion of the electrode catalyst layer near the fuel gas outlet manifold 24b and the oxidant gas inlet manifold 22a is smaller than the amount of cracks in a portion of the electrode catalyst layer near the fuel gas inlet manifold 24a and the oxidant gas outlet manifold 22b. To be specific, referring to FIG. 8, the length or the width of the crack Cr in the first region 66a of the cathode electrode 66 is smaller than the length or the width of the crack Cr in the second region 66b of the cathode electrode 66.

Therefore, the quality control of cracks in the portion of the electrode catalyst layer of the cathode electrode 66 near the fuel gas outlet manifold 24b and the oxidant gas inlet manifold 22a is performed on the basis of a strict standard. Accordingly, damage to the electrode catalyst layer of the cathode electrode 66, which is a region subjected to severest conditions during power generation, can be suppressed, and the cracks Cr in the electrode catalyst layer can be appropriately controlled.

Moreover, the crack control is performed, in particular, on the cathode electrode 66 of the second membrane electrode assembly 62, in which the anode electrode 68 is located closest to the coolant channel 27. Thus, an advantage is obtained in that the durability of the second membrane electrode assembly 62 can be easily improved. Preferably, the crack control is performed also in the first membrane electrode assembly 60, because damage to the first membrane electrode assembly 60 during power generation is also affected by the cracks Cr.

Moreover, in the present embodiment, two corners of the cathode electrode 66 near the oxidant gas outlet manifold 22b each have the radius of curvature R1, as illustrated in FIGS. 5 and 6. Two corners of the cathode electrode 66 near the fuel gas outlet manifold 24b each have the radius of curvature R2, which is different from the radius of curvature R1. For example, R1<R2.

Therefore, referring to FIG. 5, when joining the first membrane electrode assembly 60 to the first resin frame member 70, the first membrane electrode assembly 60 and the first resin frame member 70 are prevented from being positioned relative to each other in such a way that the cathode electrode 66 is directed in the opposite direction. Likewise, when joining the second membrane electrode assembly 62 to the second resin frame member 72, the second membrane electrode assembly 62 and the second resin frame member 72 are prevented from positioned relative to each other in such a way that the cathode electrode 66 is directed in the opposite direction.

Accordingly, the quality control of cracks in the electrode catalyst layer of the cathode electrode 66 near the fuel gas outlet manifold 24b and the oxidant gas inlet manifold 22a can be performed on the basis of a strict standard.

The present disclosure provides a fuel cell in which cracks in an electrode catalyst layer can be appropriately controlled and the durability of which can be easily improved.

According to the present disclosure, a fuel cell includes a membrane electrode assembly having a rectangular shape and including a solid polymer electrolyte membrane, a cathode electrode disposed on one surface of the solid polymer electrolyte membrane, and an anode electrode disposed on the other surface of the solid polymer electrolyte membrane; and a separator stacked on the membrane electrode assembly.

The fuel cell includes a fuel gas channel through which a fuel gas flows along an electrode surface of the anode electrode, and an oxidant gas channel through which an oxidant gas flows along an electrode surface of the cathode electrode in a direction opposite to a direction in which the fuel gas flows through the fuel gas channel. The fuel cell includes a fuel gas outlet manifold and an oxidant gas inlet manifold that are formed near one end of the rectangular shape in a longitudinal direction, the fuel gas outlet manifold discharging the fuel gas in a stacking direction in which the membrane electrode assembly and the separator are stacked, the oxidant gas inlet manifold supplying the oxidant gas in the stacking direction. The fuel cell includes a fuel gas inlet manifold and an oxidant gas outlet manifold that are formed near the other end of the rectangular shape in the longitudinal direction, the fuel gas inlet manifold supplying the fuel gas in the stacking direction, the oxidant gas outlet manifold discharging the oxidant gas in the stacking direction.

In at least one of the cathode electrode and the anode electrode, an amount of cracks in a portion of an electrode catalyst layer near the one end in the longitudinal direction is smaller than an amount of cracks in a portion of the electrode catalyst layer near the other end in the longitudinal direction.

In the fuel cell, preferably, the membrane electrode assembly is a resin-framed MEA including a resin frame member that surrounds an outer periphery of the solid polymer electrolyte membrane. In this case, preferably, a shape of a corner of a portion of the membrane electrode assembly near the one end in the longitudinal direction differs from a shape of a corner of a portion of the membrane electrode assembly near the other end in the longitudinal direction, the corners being disposed on the resin frame member.

In the fuel cell, preferably, the portion near the one end in the longitudinal direction is in a range of $0.02 \times L$ to $0.1 \times L$ from the one end, where L is a length of the electrode catalyst layer in the longitudinal direction.

Preferably, the fuel cell includes power generation cells each including a first separator, a first resin-framed MEA, a second separator, a second resin-framed MEA, and a third separator that are stacked. In this case, preferably, a coolant channel is formed between each pair of the power generation cells that are adjacent to each other, and the electrode catalyst layer is an electrode catalyst layer of the cathode electrode that faces the anode electrode that is adjacent to the coolant channel with the solid polymer electrolyte membrane therebetween.

With the present disclosure, the amount of cracks in a portion of the electrode catalyst layer near the fuel gas outlet manifold and the oxidant gas inlet manifold is smaller than the amount of cracks in a portion of the electrode catalyst layer near the fuel gas inlet manifold and the oxidant gas outlet manifold. Therefore, the quality control of cracks in the portion of the electrode catalyst layer near the fuel gas outlet manifold and the oxidant gas inlet manifold is performed on the basis of a strict standard. Accordingly, the damage of the electrode catalyst layer in a region subjected to the severest conditions during power generation can be suppressed, the cracks in the electrode catalyst layer can be appropriately controlled, and the durability of the membrane electrode assembly can be easily improved.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell comprising:
   a membrane electrode assembly having a rectangular shape and including a solid polymer electrolyte membrane, a cathode electrode disposed on one surface of the solid polymer electrolyte membrane, and an anode electrode disposed on the other surface of the solid polymer electrolyte membrane;
   a separator stacked on the membrane electrode assembly;
   a fuel gas channel through which a fuel gas flows along an electrode surface of the anode electrode;
   an oxidant gas channel through which an oxidant gas flows along an electrode surface of the cathode electrode in a direction opposite to a direction in which the fuel gas flows through the fuel gas channel;
   a fuel gas outlet manifold and an oxidant gas inlet manifold that are formed near one end of the rectangular shape in a longitudinal direction, the fuel gas outlet manifold discharging the fuel gas in a stacking direction in which the membrane electrode assembly and the separator are stacked, the oxidant gas inlet manifold supplying the oxidant gas in the stacking direction; and
   a fuel gas inlet manifold and an oxidant gas outlet manifold that are formed near the other end of the rectangular shape in the longitudinal direction, the fuel gas inlet manifold supplying the fuel gas in the stacking direction, the oxidant gas outlet manifold discharging the oxidant gas in the stacking direction,
   wherein, in at least one of the cathode electrode and the anode electrode, an amount of cracks in a portion of an electrode catalyst layer near the one end in the longitudinal direction is smaller than an amount of cracks in a portion of the electrode catalyst layer near the other end in the longitudinal direction, the portion of the electrode catalyst layer near the one end being defined as a first region extending from the one end to an imaginary line spaced from the one end by a first distance in the longitudinal direction, and the portion of the electrode catalyst layer near the other end being defined as a second region extending from the other end to the imaginary line spaced from the other end by a second distance in the longitudinal direction.

2. The fuel cell according to claim 1,
   wherein the membrane electrode assembly is a resin-framed MEA including a resin frame member that surrounds an outer periphery of the solid polymer electrolyte membrane, and wherein a shape of a corner of a portion of the membrane electrode assembly near the one end in the longitudinal direction differs from a shape of a corner of a portion of the membrane electrode assembly near the other end in the longitudinal direction, the corners being disposed on the resin frame member.

3. The fuel cell according to claim 1, wherein the first distance is in a range of 0.02×L to 0.1×L from the one end, where L is a length of the electrode catalyst layer in the longitudinal direction.

4. The fuel cell according to claim 2, comprising:
power generation cells each including a first separator, a first resin-framed MEA, a second separator, a second resin-framed MEA, and a third separator that are stacked,
wherein a coolant channel is formed between each pair of the power generation cells that are adjacent to each other, and
wherein the electrode catalyst layer is an electrode catalyst layer of the cathode electrode that faces the anode electrode that is closest to the coolant channel with the solid polymer electrolyte membrane therebetween.

5. A fuel cell comprising:
a membrane electrode assembly having a substantially rectangular shape having a first side and a second side opposite to the first side in a side direction, the substantially rectangular shape comprising:
a first portion which is closer to the first side than to the second side in the side direction; and
a second portion which is a remaining portion of the substantially rectangular shape which excludes the first portion,
the membrane electrode assembly comprising:
a solid polymer electrolyte membrane having a first surface and a second surface opposite to the first surface in a stacking direction;
a cathode electrode disposed on the first surface; and
an anode electrode disposed on the second surface, at least one of the cathode electrode and the anode electrode having a smaller amount of cracks in an electrode catalyst layer in the first portion than in the second portion, the first portion being defined as a first region extending from one end of the cathode electrode or the anode electrode to an imaginary line at a first distance from the one end in the side direction, the second portion being defined as a second region extending from another end of the cathode electrode or the anode electrode to the imaginary line at a second distance from the another end in the side direction;
a separator stacked on the membrane electrode assembly in the stacking direction;
a fuel gas channel which is provided on a side of the anode electrode and through which a fuel gas flows in a first flow direction from the second side to the first side along an electrode surface of the anode electrode;
an oxidant gas channel which is provided on a side of the cathode electrode and through which an oxidant gas flows in a second flow direction from the first side to the second side along an electrode surface of the cathode electrode;
a fuel gas outlet manifold connected to the fuel gas channel to discharge the fuel gas in the stacking direction;
an oxidant gas inlet manifold connected to the oxidant gas channel to supply the oxidant gas in the stacking direction, the fuel gas outlet manifold and the oxidant gas inlet manifold being closer to the first side than to the second side in the side direction;
a fuel gas inlet manifold connected to the fuel gas channel to supply the fuel gas in the stacking direction; and
an oxidant gas outlet manifold connected to the oxidant gas channel to discharge the oxidant gas in the stacking direction, the fuel gas inlet manifold and the oxidant gas outlet manifold being closer to the second side than to the first side in the side direction.

6. The fuel cell according to claim 5,
wherein the membrane electrode assembly further comprises a resin frame member that surrounds an outer periphery of the solid polymer electrolyte membrane to constitute a resin-framed membrane electrode assembly,
wherein the resin frame member has a first corner to which the first side of the membrane electrode assembly is attached and a second corner to which the second side of the membrane electrode assembly is attached, and
wherein a shape of the first corner is different from a shape of the second corner.

7. The fuel cell according to claim 5, wherein the first distance is in a range of 0.02×L to 0.1×L from the one end, where L is a length of the electrode catalyst layer in the side direction.

8. The fuel cell according to claim 6, comprising:
power generation cells each including a first separator, a first resin-framed membrane electrode assembly, a second separator, a second resin-framed membrane electrode assembly, and a third separator which are stacked in the stacking direction,
wherein a coolant channel is formed between each pair of the power generation cells that are adjacent to each other, and
wherein the electrode catalyst layer is in the cathode electrode that faces the anode electrode that is closest to the coolant channel with the solid polymer electrolyte membrane therebetween.

9. The fuel cell according to claim 1, wherein an average length of a plurality of cracks in the portion of the electrode catalyst layer near the one end is smaller than an average length of a plurality of cracks in the portion of the electrode catalyst layer near the other end.

10. The fuel cell according to claim 1, wherein an average width of a plurality of cracks in the portion of the electrode catalyst layer near the one end is smaller than an average width of a plurality of cracks in the portion of the electrode catalyst layer near the other end.

11. The fuel cell according to claim 1,
wherein the membrane electrode assembly is a resin-framed MEA including a resin frame member that surrounds an outer periphery of the solid polymer electrolyte membrane, and
wherein a radius of curvature of a corner of a portion of the membrane electrode assembly near the one end in the longitudinal direction differs from a radius of curvature of a corner of a portion of the membrane electrode assembly near the other end in the longitudinal direction, the corners being disposed on the resin frame member.

12. The fuel cell according to claim 5, wherein an average length of a plurality of cracks in the first portion of the electrode catalyst layer is smaller than an average length of a plurality of cracks in the second portion of the electrode catalyst layer.

13. The fuel cell according to claim 5, wherein an average width of a plurality of cracks in the first portion of the electrode catalyst layer is smaller than an average width of a plurality of cracks in the second portion of the electrode catalyst layer.

14. The fuel cell according to claim 5,
wherein the membrane electrode assembly further comprises a resin frame member that surrounds an outer periphery of the solid polymer electrolyte membrane to constitute a resin-framed membrane electrode assembly,
wherein the resin frame member has a first corner to which the first side of the membrane electrode assembly is attached and a second corner to which the second side of the membrane electrode assembly is attached, and
wherein a radius of curvature of the first corner is different from a radius of curvature of the second corner.

* * * * *